United States Patent
Shah et al.

(10) Patent No.: US 12,506,818 B2
(45) Date of Patent: Dec. 23, 2025

(54) METHOD AND SYSTEM FOR TIME SENSITIVE PROCESSING OF TCP SEGMENTS INTO APPLICATION LAYER MESSAGES

(71) Applicant: Tata Consultancy Services Limited, Mumbai (IN)

(72) Inventors: Dhaval Shah, Thane West (IN); Manoj Nambiar, Thane West (IN); Ishtiyaque Shaikh, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 252 days.

(21) Appl. No.: 18/335,229

(22) Filed: Jun. 15, 2023

(65) Prior Publication Data
US 2023/0412714 A1  Dec. 21, 2023

(30) Foreign Application Priority Data
Jun. 15, 2022 (IN) .............................. 202221034376

(51) Int. Cl.
*H04L 69/321* (2022.01)
*H04L 69/16* (2022.01)

(52) U.S. Cl.
CPC .......... *H04L 69/321* (2013.01); *H04L 69/161* (2013.01)

(58) Field of Classification Search
CPC .......................... H04L 69/321; H04L 69/161
See application file for complete search history.

(56) References Cited

U.S. PATENT DOCUMENTS

| | | | |
|---|---|---|---|
| 6,665,292 B1* | 12/2003 | Bradshaw .......... | H04N 21/4348 370/312 |
| 2014/0236974 A1* | 8/2014 | Houstoun .............. | G06Q 40/00 707/756 |
| 2014/0379553 A1* | 12/2014 | Hurd ....................... | H04L 67/12 705/37 |

(Continued)

OTHER PUBLICATIONS

Morton, A. "Packet Reordering Metrics" 2006, RFC 4737. "https://datatracker.ietf.org/doc/rfc4737/" (Year: 2006).*

(Continued)

*Primary Examiner* — Dhairya A Patel
*Assistant Examiner* — Eui H Kim
(74) *Attorney, Agent, or Firm* — FINNEGAN, hENDERSON, FARABOW, GARRETT & DUNNER LLP (57) ABSTRACT

This disclosure relates to time sensitive processing of TCP segments into application layer messages in FPGA. Certain applications such as "stock market" or "ticket booking system" require a time sensitive ordering of the transaction, as the timing of arrival of transaction (packet) will impact the result, wherein the time sensitive ordering occurs when a first packet reaching the application network is processed first or the processing of packets by the server is guaranteed in the order of packets received. However, the existing systems do not honor the time due to the layered network stack. The disclosure is a design and implementation of a middleware framework on FPGA platform which delivers messages to the application in the order in which they arrive. The disclosure enables time sensitive analysis of each message of the TCP segment based on the session-based information to re-assemble the plurality of messages in a time-sensitive queue.

9 Claims, 6 Drawing Sheets

(56) References Cited

U.S. PATENT DOCUMENTS

2016/0105469 A1* 4/2016 Galloway ........... H04L 63/1416
709/231

OTHER PUBLICATIONS

Torres Jr, Pedro Rodrigues. "Packet Reordering Metrics to Enable Performance Comparison in IP-Networks", 2020. "https://onlinelibrary.wiley.com/doi/10.1155/2020/8465191" (Year: 2020).*
D et al., "Design and Implementation of Efficient Packet Classification on FPGA for Noc based Designs," International Journal of Engineering Research & Technology (2015).
Mohammadpour et al., "On Packet Reordering in Time-Sensitive Networks," (2021).

* cited by examiner

RECEIVING A PLURALITY OF INPUTS, FROM A CLIENT, WHEREIN THE PLURALITY OF INPUTS COMPRISES A PLURALITY OF TRANSMISSION CONTROL PROTOCOL (TCP) SEGMENTS, WHEREIN — 302

EACH OF THE PLURALITY OF TCP SEGMENTS IS A RANDOM SEQUENCE OF A PLURALITY OF MESSAGES, WHEREIN THE PLURALITY OF MESSAGES IS A COMBINATION OF A) A PLURALITY OF PARTIAL MESSAGE, AND (B) A PLURALITY OF COMPLETE MESSAGE

EACH OF THE MESSAGES FROM THE PLURALITY OF MESSAGES IS ASSOCIATED WITH A SESSION-BASED INFORMATION, WHERE THE SESSION-BASED INFORMATION INCLUDES A CONNECTION_ID, A MESSAGE LENGTH, AND A HEAD POINTER AND

THE MESSAGE LENGTH IS ASSOCIATED WITH A START OF MESSAGE (SOM) AND AN END OF A MESSAGE (EOM), WHEREIN THE SOM INDICATES BEGINNING OF A MESSAGE AND THE EOM INDICATES END OF THE MESSAGE

METHOD AND SYSTEM FOR TIME SENSITIVE PROCESSING OF TCP SEGMENTS INTO APPLICATION LAYER MESSAGES

PRIORITY CLAIM

This U.S. patent application claims priority under 35 U.S.C. § 119 to: India Application No. 202221034376, filed on 15 Jun. 2022. The entire contents of the aforementioned application are incorporated herein by reference.

TECHNICAL FIELD

The disclosure herein generally relates to a Field Programmable Gate Array (FPGA), and, more particularly, to time sensitive processing of TCP segments into application layer messages in FPGA.

BACKGROUND

In recent years, communication speed in digital systems has increased drastically and has brought in a growing need to ensure a good/high performance with respect to a high throughput, a low latency, and a low resource utilization. The field-programmable gate array (FPGA) is widely used to address the demand of good/high performance in digital communication. The FPGAs have established themselves as one of the preferred digital implementation platforms in current industrial applications/enterprise applications features due to the FPGA s design which may be configured by a designer or developer after manufacturing. The FPGA is utilized in several domains including computational domain, financial domain, IoT domain, data center applications, and high frequency trading algorithms, for the high performance. Some applications including financial applications or booking applications such as "stock market" or "ticket booking system" require a time sensitive ordering wherein the transaction placed by several customers is honored to the extent possible as the timing of arrival of transaction (packet) will impact the result. The time sensitive ordering occurs when a first packet reaching the application network is processed first or the processing of packets by the server is guaranteed in the order of packets received.

However, the state-of-the-art systems including traditional UNIX and Windows based hosts, do not honor the time due to the layered network stack. Hence, to ensure that the transactions are serviced in a time-sensitive manner as per the timing of arrival of transaction (packet), there is a requirement for a dedicated functionality to be implemented by any application using the FPGA.

SUMMARY

Embodiments of the present disclosure present technological improvements as solutions to one or more of the above-mentioned technical problems recognized by the inventors in conventional systems. For example, in one embodiment, a method for time sensitive processing of TCP segments into application layer messages is provided.

The system is configured to receive a plurality of inputs, from a client, wherein the plurality of inputs comprises a plurality of Transmission Control Protocol (TCP) segments. The system is further configured to analyze each message of the plurality of TCP segment based on the session-based information and re-assembling the plurality of messages in a time-sensitive queue, wherein the process of analyzing and re-assembling comprises: identifying the message as one of a partial message or a complete message using the session-based information; and based on the identification of the message, performing one of: upon identifying the message as a partial message, searching for a similar partial message using the session-based information, and based on search, performing one of: upon not identifying the similar partial message, saving the partial message and waiting for the similar partial message to be received; and upon identifying the similar partial message, appending the partial message to the similar partial message to obtain a complete message and saving the complete message as an application layer message in the time-sensitive queue; upon identifying the message as the complete message, saving the complete message as the application layer message in the time-sensitive queue. The system is further configured to retrieve the application layer message in the time sensitive order, wherein the application layer messages are retrieved in the time-sensitive order based on the detection of the EOM.

In another aspect, a method for time sensitive processing of TCP segments into application layer messages is provided. The method includes receiving a plurality of inputs, from a client, wherein the plurality of inputs comprises a plurality of Transmission Control Protocol (TCP) segments. The method further includes analyzing each message of the plurality of TCP segment based on the session-based information and re-assembling the plurality of messages in a time-sensitive queue, wherein the process of analyzing and re-assembling comprises: identifying the message as one of a partial message or a complete message using the session-based information; and based on the identification of the message, performing one of: upon identifying the message as a partial message, searching for a similar partial message using the session-based information, and based on search, performing one of: upon not identifying the similar partial message, saving the partial message and waiting for the similar partial message to be received; and upon identifying the similar partial message, appending the partial message to the similar partial message to obtain a complete message and saving the complete message as an application layer message in the time-sensitive queue; upon identifying the message as the complete message, saving the complete message as the application layer message in the time-sensitive queue. The method further includes retrieving the application layer message in the time sensitive order, wherein the application layer messages are retrieved in the time-sensitive order based on the detection of the EOM.

In yet another aspect, a non-transitory computer readable medium for time sensitive processing of TCP segments into application layer messages. The program includes receiving a plurality of inputs, from a client, wherein the plurality of inputs comprises a plurality of Transmission Control Protocol (TCP) segments. The method further includes analyzing each message of the plurality of TCP segment based on the session-based information and re-assembling the plurality of messages in a time-sensitive queue, wherein the process of analyzing and re-assembling comprises: identifying the message as one of a partial message or a complete message using the session-based information; and based on the identification of the message, performing one of: upon identifying the message as a partial message, searching for a similar partial message using the session-based information, and based on search, performing one of: upon not identifying the similar partial message, saving the partial message and waiting for the similar partial message to be received; and upon identifying the similar partial message, appending the partial message to the similar partial message to obtain a complete message and saving the complete message as an application layer message in the time-sensitive queue; upon identifying the message as the complete message, saving the complete message as the application layer message in the time-sensitive queue. The method further includes retrieving the application layer message in the time sensitive order, wherein the application layer messages are retrieved in the time-sensitive order based on the detection of the EOM.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

There are certain applications such as stock exchange trading, brokerage, ticket booking systems that are expected to be sensitive to the time of arrival of the packet to the corresponding server. In such time sensitive applications, the timing of arrival of packet may impact the result, hence the time-sensitive applications must guarantee that the first request reached to system will be delivered/processed/serviced first. To ensure this, dedicated functionality needs to be implemented in the application. In most of the existing state of art systems, the system ignores the need to process in an order in which the packets are received because the ordering information is lost due to buffering across the different TCP connections. Hence, the application has a choice to read from any connection, due which the time sensitivity of the messages is lost, and message is delivered to the application in unfair way in any random order of connection completion. The disclosure is a method and a system based on a FPGA middleware for TCP segments to message conversion up to application layer in a time sensitive order at each layer in the TCP/IP stack, wherein the packets are not re-ordered across the layers like the existing state of art systems.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Figure 1:
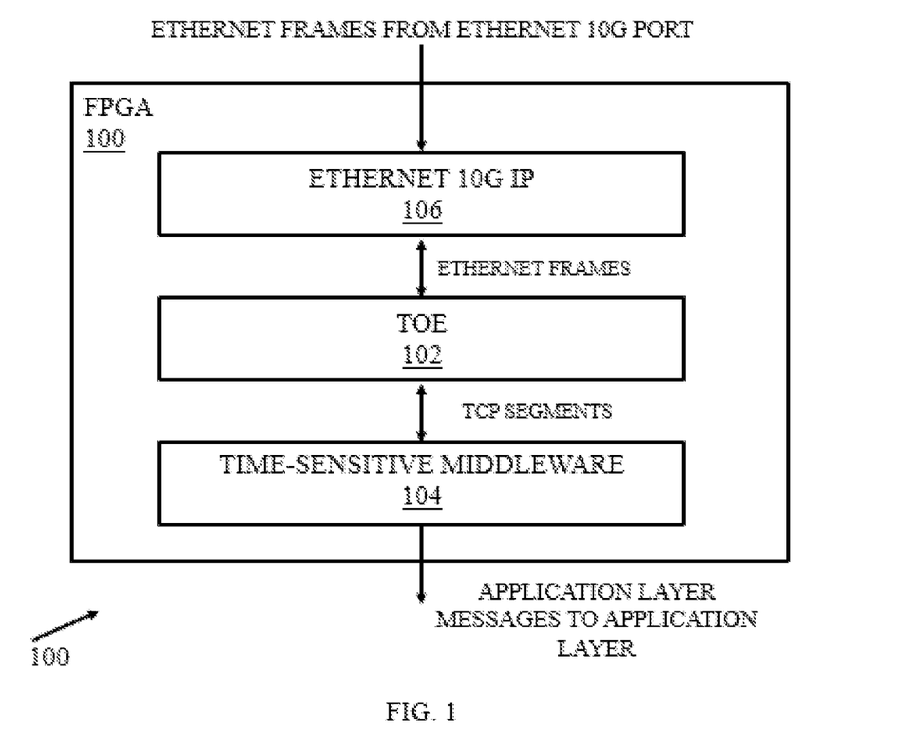
FIG. 1 illustrates a communication middleware framework for time sensitive processing of TCP segments into application layer messages according to some embodiments of the present disclosure.

The FIG. 1 is a FPGA based communication middleware framework (100). The disclosed FPGA 100 delivers messages to the application layer in a time-sensitive order, wherein the time-sensitive order is order in which the packets arrive at the network inter-face. This FPGA 100 is comprising a TCP Offload Engine (TOE) 102, and a time-sensitive middleware 104 for time sensitive processing of TCP segments into application layer messages. The combined functionalities of the TOE and the time-sensitive middleware enable message delivery in the time sensitive order. The Ethernet 10G IP 106 is the module configured to receive in Ethernet frames/packets from the network interface and passes data frames on to the TOE for further TCP/IP processing in the time-sensitive middleware 104 for time sensitive processing of TCP segments into application layer messages in the order in which they arrive to finally reach an application layer. The application layer is an application that requires time sensitive application layer messages—which is not re-ordered but is in the order in which the packets arrive at the network inter-face.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

The various modules of the system 100 are configured to perform time sensitive processing of TCP segments into application layer messages and are implemented as at least one of a logically self-contained part of a software program, a self-contained hardware component, and/or, a self-contained hardware component with a logically self-contained part of a software program embedded into each of the hardware component that when executed perform the above method described herein.

Figure 2:
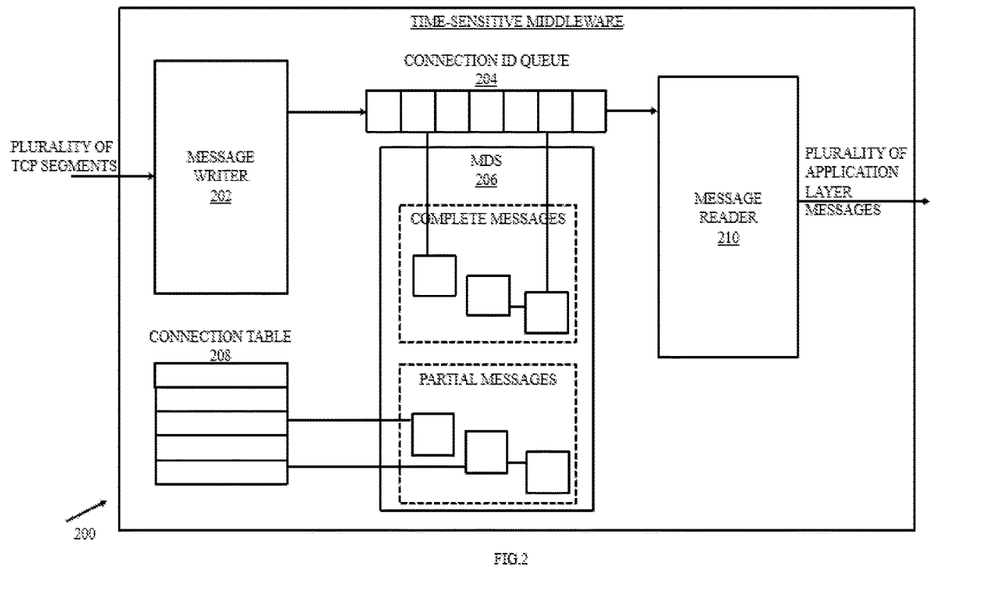
FIG. 2 is a functional block diagram of a time-sensitive middleware in the communication middleware framework according to some embodiments of the present disclosure.

The FIG. 2 is a functional block diagram of the time-sensitive middleware from the FIG. 1 for the time sensitive processing of TCP segments into application layer messages. The system 200 comprises a message writer 202 configured for receiving a plurality of inputs, via the TOE from a client, wherein the plurality of inputs comprises a plurality of Transmission Control Protocol (TCP) segments. The system 200 further comprises a connection ID queue 204 configured for analyzing each message of the TCP segments based on the session-based information and for re-assembling the plurality of messages in a time-sensitive queue. The connection ID queue 204 is also configured for: identifying the message as one of a partial message or a complete message using the session-based information. Further upon identifying the message as a partial message, the connection ID queue 204 searches for a similar partial message in a Message descriptor (MDS) pool 206 using the session-based information and based on search perform one of: (a) upon not identifying a similar partial message, save the partial message in the MDS 206 and a connection table 208 and wait for the similar partial message to be received; (b) upon identifying a similar partial message in the MDS 206 and the connection table 208, append the partial message to the similar partial message to obtain a complete message and save the complete message as an application layer message in the time-sensitive queue of the connection ID queue 204. The connection ID queue 204 is also configured to save the complete message as an application layer message in the time-sensitive queue if the message is identified as a complete message. The system 200 further comprises a message reader 210 configured for retrieving the application layer message in the time sensitive order, wherein the application layer messages are retrieved in the time-sensitive order based on the detection of the EOM.

Functions of the components of the system 100 are explained in conjunction with flow diagram of FIG. 2A, FIG. 2B and FIG. 2C. The FIG. 2A, FIG. 2B and FIG. 2C with reference to FIG. 1, is an exemplary flow diagram illustrating a method 200 for method and system for time sensitive processing of TCP segments into application layer messages using the system 100 of FIG. 1 according to an embodiment of the present disclosure.

Figure 3A:
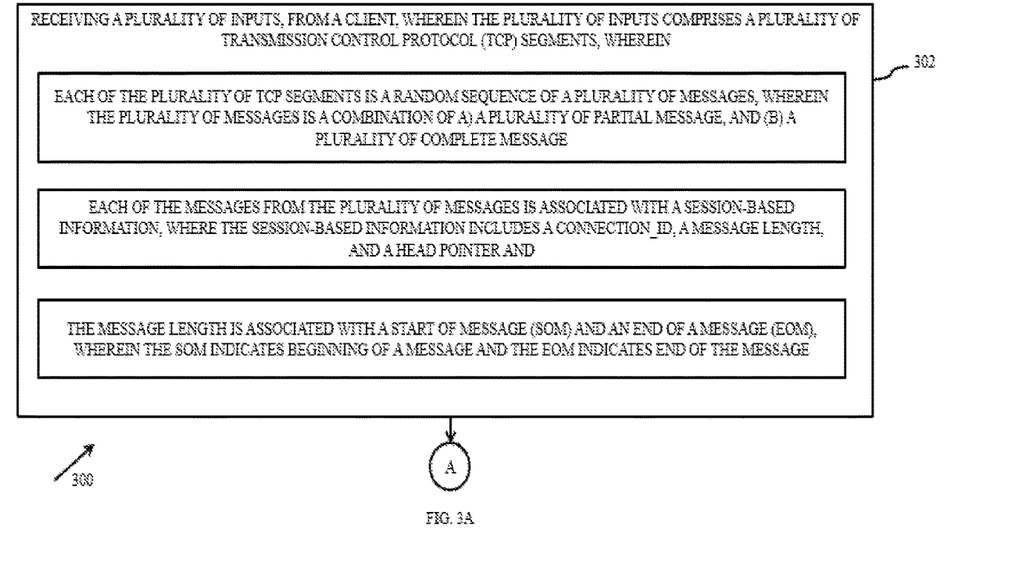
FIG. 3A, FIG. 3B and FIG. 3C is a flow diagram illustrating method and system for time sensitive processing of TCP segments into application layer messages in accordance with some embodiments of the present disclosure.
Figure 3B:
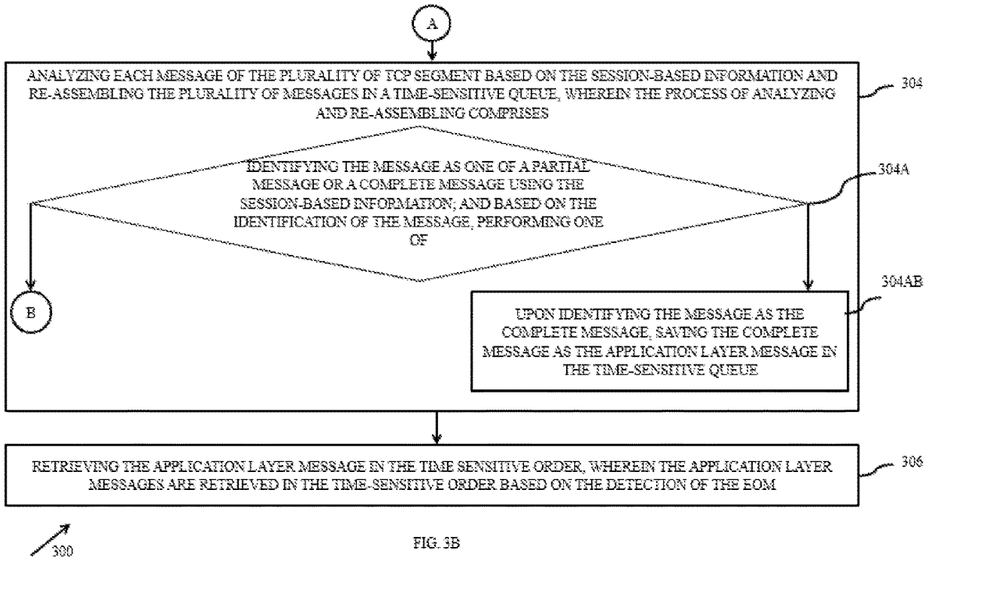
Figure 3C:
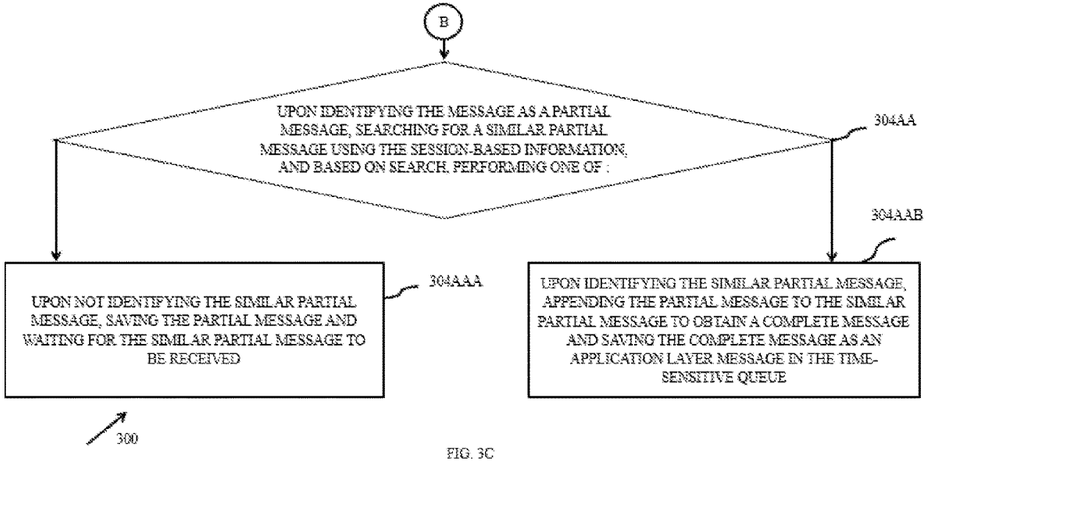

The steps of the method of the present disclosure will now be explained with reference to the components of the system 100 for method and system for time sensitive processing of TCP segments into application layer messages as depicted the flow diagrams as depicted in FIG. 3A, FIG. 3B and FIG. 3C. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method (300), a plurality of inputs is received at the message writer 202. The plurality of inputs comprises a plurality of Transmission Control Protocol (TCP) segments. The plurality of inputs is received at the message writer 202 via a TCP-TOE from a client.

In an embodiment, each of the plurality of TCP segments is a random sequence of a plurality of messages, wherein the plurality of messages is a combination of a) a plurality of partial message, and (b) a plurality of complete message. Each of the plurality of messages is associated with a session-based information, where the session-based information includes a connection_id, a message length and a head pointer. The message length is associated a start of message (SOM) and an end of a message (EOM), wherein the SOM indicates a beginning of a message and the EOM indicates an end of the message. The plurality of message appears in the network as packets in a random sequence.

In an embodiment, the client is an application or a system that requires servicing from the FPGA system. In an example scenario, the client is aa application or a system that requires time-sensitive processing of the TCP segments such as a ticket booking system, or a stock exchange or a online marketing system where time of transaction is Every message comprises a header and a payload part. The header has message length. Input output pins of the S2MC IP is explained as follows. Input port consists of segment with segment word of 64-bit, i/p 1-bit for valid, SOS (start of segment), EOS (end of segment), o/p 1-bit accept, i/p 15-bit session id, i/p 3-bit byte_vld. Similarly output ports consists of o/p 64-bit message word, o/p 1-bit message_valid, SOM (start of message), EOM (end of message), i/p 1-bit for message_accept. o/p 15-bit are used for indicating session id and o/p 3-bit also to indicate message_byte_vld.

At step 304 of the method (300), each message of the TCP segment is analyzed at the connection_ID_queue 204. Each message of the TCP segment is analyzed based on the session-based information.

The time sensitive processing of TCP segments into application layer messages includes processing the messages of the TCP segments in same order as they appear on a physical network interface before they are received at the TCP-TOE, wherein the TCP segments are processed on first-come basis without altering the order of the messages within the TCP segment. The time-sensitive queue is a time-sensitive sequence of messages within the TCP segment, wherein the messages are re-assembled based on a time of arrival of each of the complete messages using the message length. Hence, the packet which arrives at physical layer is delivered to the application in same order it is received by the application without any re-ordering. The analyzed messages of the TCP segments are re-assembled in a time-sensitive queue at the connection_ID_queue 204, which is explained in the next section.

The messages of the TCP segments are analyzed and then based on the analysis, the messages are re-assembled in a time-sensitive queue by the MDS 206 and connection table 208 at the connection_ID_queue 204. Each message of the TCP segment is analyzed based on the session-based information as explained in step 304A.

The connection_ID_queue 204 is a First-In-First-Out (FIFO) queue in which each entry points to the start of a message is saved. The SOM is associated with the head pointer that belongs to the session-based information, where the session-based information also includes includes a connection_id, a message length and a head pointer associated.

The MDS 206 is a pool of descriptors of the messages. Each descriptor is associated with a fixed size message buffer. Message buffers are used to hold the message data. One message can be associated with a list of MDS's depending on its size. A linked list of MDS's point to the entire message in sequence, with the head of the linked list pointing to the start of the message. This head is associated to the TCP connection in the connection table 208.

At step 304A of method 300, the analysis includes identifying the message as one of a partial message or a complete message using the session-based information and performing one of the steps of 304AA or 304AB based on the identification of message:

At step 304AA of the method 300, upon not identifying a similar partial message, save the partial message in the MDS 206 and connection table 208 and wait for the similar partial message to be received.

The similar message is identified using the session-based information, specifically the connection_id and the message length based on a search in the MDS 206 for the same number associated with the connection_id and the message length.

When a TCP segment arrives from the TOE, the MW 202 locates the last MDS in the MDS 206, in list of MDS's associated with the connection table. If there is no such descriptor (in case of a new message), a new MDS is removed from the MDS pool and associated with the connection table 208.

At step 304AB of the method 300, upon identifying a similar partial message in the MDS 206, the partial message is appended to the similar partial message to obtain a complete message. The complete message is saved as an application layer message in the time-sensitive queue of the connection_ID_queue 204. The connection_ID_queue 204 has a valid entry for each TCP segment of a active client connection. It is used to hold partial messages.

When a TCP segment arrives from the TOE, the MW 202 locates the last MDS in the MDS 206, in list of MDS's associated with the connection table. If there is no such descriptor (in case of a new message), a new MDS is removed from the MDS pool and associated with the connection. The incoming TCP segment is copied into the buffer space of the MDS. These steps are repeated till the entire segment is copied into the MDS's buffer space while appending each MDS to the list as captured in step 304AA and 304AB.

At step 304B of the method 300, upon identifying the message as a complete message saving the complete message as an application layer message in the time-sensitive queue of the connection_ID_queue 204.

Upon identifying the message as a complete message, the message is saved in the connection_ID_queue 204. The MR reads from tail of the connection id queue 204, locates the MDS buffers in the sequence of the MDS list and copies the message contents from the MDS buffers to the application when it indicates readiness to read the next message.

At step 306 of the method 300, the application layer message is retrieved from the connection_ID_queue 204 in the time sensitive order by the message reader 210. The application layer messages are retrieved in the time-sensitive order based on the detection of the EOM.

The MW 202 also determines if the end of message (EOM) is detected in a given TCP segment based on its size. For every such EOM which gets copied into the MDS buffer, the head of the MDS list is disassociated with the TCP connection (removed from the connection table) and queued up at the head of the connection id queue. The MR reads from tail of the connection id queue, locates the MDS buffers in the sequence of the MDS list and copies the message contents from the MDS buffers to the application when it indicates readiness to read the next message. When all the message contents in the buffer are pushed to the application, the MR returns the entire MDS list for the messages to the MDS pool.

Figure 4:
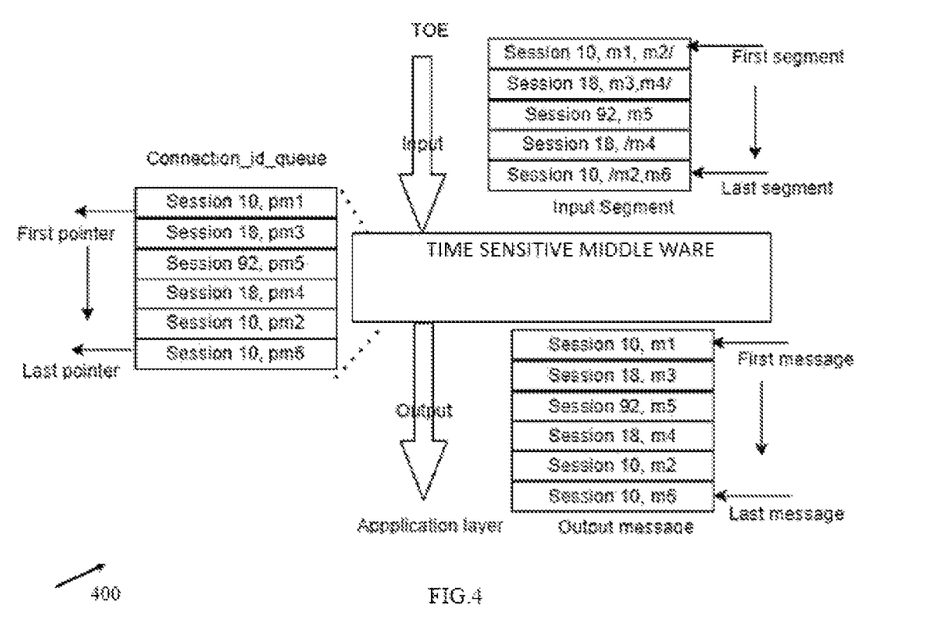
FIG. 4 is an example scenario explaining time sensitive processing of TCP segments into application layer messages according to some embodiments of the present disclosure.

An example scenario of the method and system for time sensitive processing of TCP segments into application layer messages is illustrated in FIG. 4, wherein first complete message m1, and partial (indicated by 'I' at end) message m2 enters the time-sensitive middleware for session 10. The session is followed by message complete m3, and partial m4 of session 18. Further a session 92 comes with a complete m5. Further, a Partial message (indicated by 'I' at beginning) m4 is completed for session 18. Further similarly partial message m2, and complete m6 for session 10 is received. Hence based on the techniques disclosed in the time sensitive processing of TCP segments into application layer messages, the messages of TCP segments are stored in connection_id_queue in the time-sensitive queue of order m1, m3, m5, m4, m2, m6. The application layer messages is in the time-sensitive queue is read out by the message reader in the same order as it is received (and saved), based on arrival of EOM.

The disclosed techniques of time sensitive processing of TCP segments into application layer messages is not only limited to FPGA, but can also be implemented on LINUX based systems. Further to perform in-order message processing in Linux: TCP/IP stack on Linux kernel should implement TCP protocol at line rate and guaranteed in-order processing of messages in order of their completion. With TCP/IP stack following this requirement the system with functionality of in-order message processing can be implemented on Linux, Unix and Windows.

The method and system for time sensitive processing of TCP segments into application layer messages is measured based on a time sensitive ordering measurement matrix, wherein the time sensitive ordering measurement matrix comprises computation of a Time sensitive ordering Index (TI), a Mean Displacement (MD) and a re-order Density (RD).

Time sensitive ordering Order Index (TI): The TI represents a number of messages that arrived as per expected order to the total number of delivered messages. The TI can be measured based on a simple metrics like time sensitive ordering order index as shown below:

$$TI = \frac{\text{Number of messages that arrived as per its expected order}}{\text{Total number of delivered messages}} \quad (1)$$

Total number of messages include in-order as well as out-of-order messages. The time sensitive ordering order index is 1 (or 100%) for a system which delivers messages completely in order of their arrival at the physical interface.

Mean Displacement (MD): The MD measures displacement based on actual and expected packet sequence, number of packets in each displacement and ratio of displacement packets with complete packet sequence. Mean Displacement (MD) is calculated on a finite packet sequence. For example, if packet sequence of N is considered then any packet coming earlier than this packet sequence or later than these packets sequence will consider loss. In calculation magnitude of displacement i.e., only positive value for displacements has been used. The MD is expressed as shown below:

$$MD = \sum_{k=-D_1}^{D_1} |i| RD[i] \quad (2)$$

where,
Reorder Density (RD) is defined distribution of the Displacement Frequencies.

Experimental Data:

Experiments have been conducted to understand the performance of the disclosed technique. The experiment has been compared against a on the Linux server setup.

Table 1 displays the results generated by the script after parsing the message logs. The script calculates the MD, TI and the latency metrics. The MD & TI metrics are) calculated between a server and Application on the Linux server setup and between point 5 and Application on FPGA setup (disclosed method). From the experimentation it is observed that there is no message re-ordering on the FPGA and messages are obtained on time-sensitive order. On Linux larger number of connections (and hence messages) the TI and MD metrics tend to rise, indicating that re-order increases with increase in traffic across all scenarios. For the 1 message 1 segment scenario between 300 and 500 connections and for the one segment with 2 messages scenario between 500 and 1000 connections anomalies are noted. Hence, it cannot be concluded the message re-ordering rises indefinitely with increasing traffic. Message reordering with traffic may not be easy to model as it depends on complex system behavior and a deeper study will be required.

TABLE 1

Time sensitive ordering metrics comparison between server mac and application input.

| | | 1 segment 1 message | | | | 1 segment 2 message | | | | 2 segment 1 message | | | |
| --- | --- | --- | --- | --- | --- | --- | --- | --- | --- | --- | --- | --- | --- |
| | | Linux | | Disclosed method | | Linux | | Disclosed method | | Linux | | Disclosed method | |
| Number of connections | Total packets | MD (1-3) | % TI (1-3) | MD (4-6) | % FI (4-6) | MD (1-3) | % FI (1-3) | MD (4-6) | % TI (4-6) | MD (1-3) | % TI (1-3) | MD (4-6) | % TI (4-6) |
| 100 | 1000 | 0.592 | 97.14 | 0 | 100 | 0.012 | 99.253 | 0 | 100 | 0.135 | 98.77 | 0 | 100 |
| 300 | 3000 | 8.803 | 24.22 | 0 | 100 | 7.99 | 65.31 | 0 | 100 | 2.7465 | 92.83 | 0 | 100 |
| 500 | 5000 | 7.646 | 45.73 | 0 | 100 | 23.57 | 29.947 | 0 | 100 | 17.425 | 34.91 | 0 | 100 |
| 1000 | 10000 | 244.9 | 10.98 | 0 | 100 | 20.75 | 33.053 | 0 | 100 | 17.535 | 1.215 | 0 | 100 |

TABLE 2

Average latency comparison (in milliseconds)

| | | 1 segment 1 message | | 1 segment 2 message | | 2 segment 1 message | |
| --- | --- | --- | --- | --- | --- | --- | --- |
| Number of connections | Total packet | Linux | Disclosed method | Linux | Disclosed method | Linux | Disclosed method |
| 100 | 1000 | 226 | 95.59 | 442.41 | 105.94 | 425 | 271.66 |
| 300 | 3000 | 543.25 | 268.90 | 745.78 | 282.16 | 856 | 798.68 |
| 500 | 5000 | 1062.78 | 478.93 | 1511.15 | 501.61 | 1,386 | 1348.34 |
| 1000 | 10000 | 1656.24 | 892.80 | 2509.59 | 926.71 | 2,873 | 2512 |

The Table 2 reports the latencies measured on the Linux and FPGA setup and in both cases, it is measured across the network at the Message Generator. It is observed that the measured latency is lesser on the FPGA based setup. Further the latencies are generally very high as they are taken on the Message Generator side. The latencies are observed to be much lesser (less than 1 ms) when observed within the server (Linux and FPGA), but we are not reporting them as we have not measured them across all scenarios as in Table 2.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiment of present disclosure herein addresses unresolved problem of time sensitive processing of TCP segments into application layer messages in FPGA. Certain applications such as "stock market" or "ticket booking system" require a time sensitive ordering of the transaction, as the timing of arrival of transaction (packet) will impact the result, wherein the time sensitive ordering occurs when a first packet reaching the application network is processed first or the processing of packets by the server is guaranteed in the order of packets received. However, the existing systems do not honor the time due to the layered network stack. The disclosure is a design and implementation of a middleware framework on FPGA platform which delivers messages to the application in the order in which they arrive. The disclosure enables time sensitive analysis of each message of the TCP segment based on the session-based information to re-assemble the plurality of messages in a time-sensitive queue.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for time sensitive processing of TCP segments into application layer messages, comprising:
   receiving a plurality of inputs, from a client, wherein the plurality of inputs comprises a plurality of Transmission Control Protocol (TCP) segments, wherein,
      each of the plurality of TCP segments is a random sequence of a plurality of messages, wherein the plurality of messages is a combination of (a) a plurality of partial message, and (b) a plurality of complete message,
      each of the messages from the plurality of messages is associated with a session-based information, where the session-based information includes a connection_id, a message length, and a head pointer, and
      the message length is associated with a start of message (SOM) and an end of a message (EOM), wherein the SOM indicates beginning of a message and the EOM indicates end of the message;
   analyzing each message of the plurality of TCP segment based on the session-based information and re-assembling the plurality of messages in a time-sensitive queue, wherein the process of analyzing and re-assembling comprises:
      identifying the message as one of a partial message or a complete message using the session-based information; and based on the identification of the message, performing:
         upon identifying the message as a partial message, searching for a similar partial message using the session-based information, and based on search, performing:
            upon not identifying the similar partial message, saving the partial message in a Message descriptor (MDS) pool and a connection table and waiting for the similar partial message to be received; and
            upon identifying the similar partial message, appending the partial message to the similar partial message to obtain a complete message and saving the complete message as an application layer message in the time-sensitive queue, wherein when the TCP segment arrives from a TCP Offload Engine (TOE), a message writer (MW) locates the last MDS in the MDS pool, in list of MDS's associated with the connection table and if the last MDS is not found, a new MDS is removed from the MDS pool and associated with the connection table, wherein the TCP segment is copied into a buffer space of the MDS pool,
            wherein the step of copying is repeated till the entire TCP segment is copied into the buffer space of the MDS pool while appending each MDS to the list as captured in the step of saving the partial message upon not identifying the similar partial message and the step of appending the partial message to the similar partial message to obtain a complete message upon identifying the similar partial message;
         upon identifying the message as the complete message, saving the complete message as the application layer message in the time-sensitive queue, wherein the MR reads from tail of the time-sensitive queue, locates the MDS buffers in a sequence of the MDS list and copies message contents from the MDS buffers to the application when it indicates readiness to read a next message; and
   retrieving the application layer message in the time sensitive order, wherein the application layer messages are retrieved in the time-sensitive order based on the detection of the EOM;
   wherein the time sensitive processing of TCP segments into application layer messages includes processing the messages of the plurality of TCP segments in an order in which they appear on a physical network interface before they are received at the TOE.

2. The method of claim 1, wherein the TCP segments are processed on first-come basis without altering the order of the messages within the plurality of TCP segment.

3. The method of claim 1, wherein the time-sensitive queue is a time-sensitive sequence of messages within the plurality of TCP segment, wherein the messages are re-assembled based on a time of arrival of each of the complete messages using the message length.

4. The method of claim 1, wherein the plurality of messages is a plurality of packets in a random sequence.

5. The method of claim 1, the time sensitive processing of TCP segments into application layer messages is measured based on a time sensitive ordering measurement matrix, wherein the time sensitive ordering measurement matrix comprises computation of a Time sensitive ordering Index (TI), a Mean Displacement (MD), and a re-order Density (RD).

6. A Field Programmable Gate Array (FPGA) configured to execute instructions for method and system for time sensitive processing of TCP segments into application layer messages, wherein the FPGA is configured to:
receive a plurality of inputs, from a client, wherein the
plurality of inputs comprises a plurality of Transmission Control Protocol (TCP) segments, wherein,
each of the plurality of TCP segments is a random sequence of a plurality of messages, wherein the plurality of messages is a combination of (a) a plurality of partial message, and (b) a plurality of complete message,
each of the messages from the plurality of messages is associated with a session-based information, where the session-based information includes a connection_id, a message length, and a head pointer, and
the message length is associated with a start of message (SOM) and an end of a message (EOM), wherein the SOM indicates beginning of a message and the EOM indicates end of the message;
analyze each message of the plurality of TCP segment based on the session-based information and re-assembling the plurality of messages in a time-sensitive queue, wherein the process of analyzing and re-assembling comprises:
identifying the message as one of a partial message or a complete message using the session-based information; and based on the identification of the message, performing:
upon identifying the message as a partial message, searching for a similar partial message using the session-based information, and based on search, performing:
upon not identifying the similar partial message, saving the partial message in a Message descriptor (MDS) pool and a connection table and waiting for the similar partial message to be received; and
upon identifying the similar partial message, appending the partial message to the similar partial message to obtain a complete message and saving the complete message as an application layer message in the time-sensitive queue, wherein when the TCP segment arrives from a TCP Offload Engine (TOE), a message writer (MW) locates the last MDS in the MDS pool, in list of MDS's associated with the connection table and if the last MDS is not found, a new MDS is removed from the MDS pool and associated with the connection table, wherein the TCP segment is copied into a buffer space of the MDS pool,
wherein the step of copying is repeated till the entire TCP segment is copied into the buffer space of the MDS pool while appending each MDS to the list as captured in the step of saving the partial message upon not identifying the similar partial message and the step of appending the partial message to the similar partial message to obtain a complete message upon identifying the similar partial message;
upon identifying the message as the complete message, saving the complete message as the application layer message in the time-sensitive queue, wherein the MR reads from tail of the time-sensitive queue, locates the MDS buffers in a sequence of the MDS list and copies message contents from the MDS buffers to the application when it indicates readiness to read a next message; and
retrieve the application layer message in the time sensitive order, wherein the application layer messages are retrieved in the time-sensitive order based on the detection of the EOM;
wherein the time sensitive processing of TCP segments into application layer messages includes processing the messages of the plurality of TCP segments in an order in which they appear on a physical network interface before they are received at the TOE.

7. The FPGA of claim 6, wherein the FPGA is a modular architecture receiving a plurality of inputs from a Transmission Control Protocol-Transmission Control Protocol Offload Engine (TCP-TOE) and sharing a plurality of output to an application layer.

8. The FPGA of claim 6 is configured to execute instructions to measure time sensitive processing of TCP segments into application layer messages based on a time sensitive ordering measurement matrix, wherein the time sensitive ordering measurement matrix comprises computation of a Time sensitive ordering Index (TI), a Mean Displacement (MD) and a re-order Density (RD).

9. One or more non-transitory machine readable information storage mediums comprising one or more instructions which when executed by one or more hardware processors cause:
receiving a plurality of inputs, from a client, wherein the
plurality of inputs comprises a plurality of Transmission Control Protocol (TCP) segments, wherein,
each of the plurality of TCP segments is a random sequence of a plurality of messages, wherein the plurality of messages is a combination of (a) a plurality of partial message, and (b) a plurality of complete message,
each of the messages from the plurality of messages is associated with a session-based information, where the session-based information includes a connection_id, a message length, and a head pointer, and
the message length is associated with a start of message (SOM) and an end of a message (EOM), wherein the SOM indicates beginning of a message and the EOM indicates end of the message;
analyzing each message of the plurality of TCP segment based on the session-based information and re-assembling the plurality of messages in a time-sensitive queue, wherein the process of analyzing and re-assembling comprises:
identifying the message as one of a partial message or a complete message using the session-based information; and based on the identification of the message, performing:
upon identifying the message as a partial message, searching for a similar partial message using the session-based information, and based on search, performing:
upon not identifying the similar partial message, saving the partial message in a Message descriptor (MDS) pool and a connection table and waiting for the similar partial message to be received; and upon identifying the similar partial message, appending the partial message to the similar partial message to obtain a complete message and saving the complete message as an application layer message in the time-sensitive queue, wherein when the TCP segment arrives from a TCP Offload Engine (TOE), a message writer (MW) locates the last MDS in the MDS pool, in list of MDS's associated with the connection table and if the last MDS is not found, a new MDS is removed from the MDS pool and associated with the connection table, wherein the TCP segment is copied into a buffer space of the MDS pool, wherein the step of copying is repeated till the entire TCP segment is copied into the buffer space of the MDS pool while appending each MDS to the list as captured in the step of saving the partial message upon not identifying the similar partial message and the step of appending the partial message to the similar partial message to obtain a complete message upon identifying the similar partial message;

upon identifying the message as the complete message, saving the complete message as the application layer message in the time-sensitive queue, wherein the MR reads from tail of the time-sensitive queue, locates the MDS buffers in a sequence of the MDS list and copies message contents from the MDS buffers to the application when it indicates readiness to read a next message; and retrieving the application layer message in the time sensitive order, wherein the application layer messages are retrieved in the time-sensitive order based on the detection of the EOM:

wherein the time sensitive processing of TCP segments into application layer messages includes processing the messages of the plurality of TCP segments in an order in which they appear on a physical network interface before they are received at the TOE.

* * * * *